Inventor
Floyd G. Hodsdon

Oct. 15, 1935.   F. G. HODSDON   2,017,754
PULSATOR FOR MILKING MACHINES
Filed July 20, 1933   6 Sheets-Sheet 2

Inventor
Floyd G. Hodsdon

Oct. 15, 1935.  F. G. HODSDON  2,017,754
PULSATOR FOR MILKING MACHINES
Filed July 20, 1933  6 Sheets-Sheet 3

Inventor
Floyd G. Hodsdon
By V. F. Lassagne
Atty.

Oct. 15, 1935. F. G. HODSDON 2,017,754
PULSATOR FOR MILKING MACHINES
Filed July 20, 1933  6 Sheets-Sheet 4

Inventor
Floyd G. Hodsdon

Oct. 15, 1935.    F. G. HODSDON    2,017,754
PULSATOR FOR MILKING MACHINES
Filed July 20, 1933    6 Sheets-Sheet 5

Inventor
Floyd G. Hodsdon
By  [signature]
Att'y.

Oct. 15, 1935.　　　F. G. HODSDON　　　2,017,754
PULSATOR FOR MILKING MACHINES
Filed July 20, 1933　　　6 Sheets-Sheet 6

Inventor
Floyd G. Hodsdon
By V. T. Sprague
Atty.

Patented Oct. 15, 1935

2,017,754

UNITED STATES PATENT OFFICE 2,017,754

PULSATOR FOR MILKING MACHINES

Floyd G. Hodsdon, Milwaukee, Wis., assignor to International Harvester Company, a corporation of New Jersey Application July 20, 1933, Serial No. 681,241

11 Claims. (Cl. 31—61)

The invention relates to a pulsator for milking machines and especially to a pulsator of the type shown in applicant's prior Patent No. 1,844,853 issued February 9, 1932. The pulsator of the prior patent consisted of a hollow, cube-shaped body carrying diaphragms to form a diaphragm chamber on each of its four sides. Two opposed diaphragms have connected thereto an upper reciprocatory slide valve called the control valve, while the two remaining opposed diaphragms have connected thereto, a lower reciprocatory slide valve called the milker valve. Cooperative ports and grooves are formed in these slide valve members, so that, when associated with certain stationary ported valve plates, the control valve regulates the action of the milker valve to result in pulsations as required, both slide valves being always subjected to full action of air and vacuum, there being a speed regulator valve associated with the upper or control valve. This prior pulsator had its two slide valves formed midway between their ends with a square area that was formed with the ports and grooves mentioned and also with passages leading oppositely to each of the diaphragm chambers. The construction was such that precision was required in the manufacture thereof, as any slight deviation in locating ports, grooves or passages resulted in improper cooperation of the valves. Especially is this true of the passages leading from the square center areas of the plates to the diaphragm chambers. While such pulsator has been commercially successful a high standard of precise manufacture must be maintained.

The object of the present invention is to provide a modified form of control and milker valve slides in which the central square areas having ports and grooves are formed as separate pieces and instead of bored passages in the slides leading to the diaphragm chambers, flexible hose connections are provided between the separate central square pieces and the diaphragms, whereby the square plates may float relative to the diaphragms and independently of the control slides, resulting in greater flexibility and overcoming the necessity for precise manufacture, and improving the operation of the pulsator.

In the accompanying sheets of drawings illustrating the pulsator.

Figure 1:
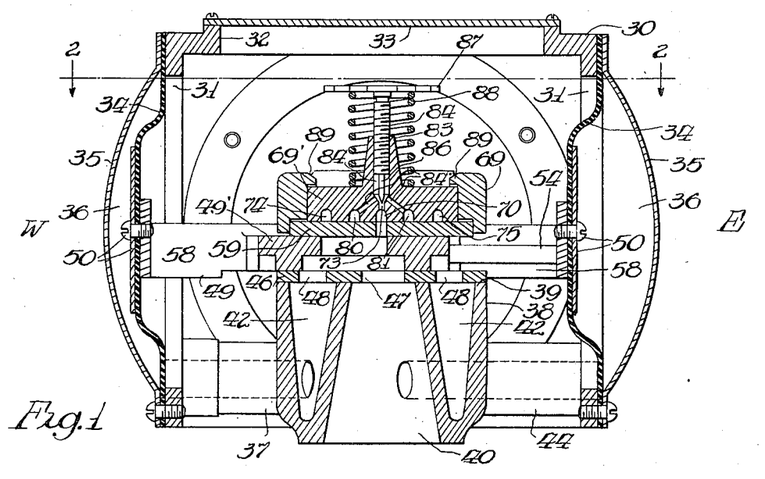
Figure 1 is a vertical, central, cross-sectional view of the pulsator taken along the line 1—1 appearing in Figure 2.
Figure 2:
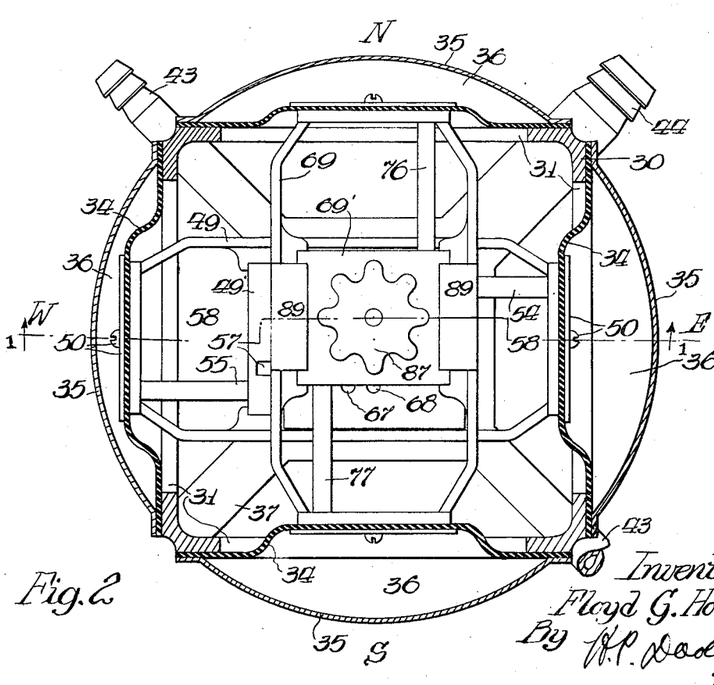
Figure 2 is a horizontal cross-sectional view through the pulsator as seen along the section line 2—2 in Figure 1, when looking in the directions of the arrows.

As best shown in Figures 1 and 2, the pulsator body shown at 30 comprises an integrally formed frame in hollow cube form having four sides and a top, each formed with a large circular opening, the side openings appearing at 31 and the top opening at 32, the latter being closed by a quickly detachable cover plate 33 to make possible ready access to and inspection of the interior parts. Each side opening is closed by a circular diaphragm 34 preferably made of a rubbered fabric, the diaphragms thus being disposed in opposed pairs, as best appears in Figure 2. These diaphragms are secured over the circular openings by means of outwardly bulged caps 35 attached by screws to the body frame. Thus, oppositely arranged diaphragm chambers 36 are formed for a purpose later to appear.

Figure 18:
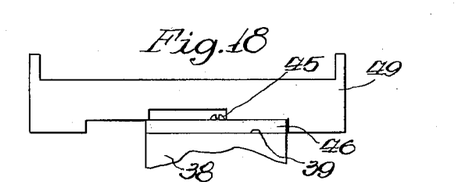
Figure 18 is a side view of the milker slide in relation to the parts on which it slides.
Figure 19:
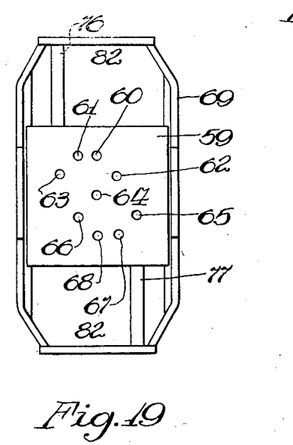
Figure 19 is a bottom plan view of the control slide as shown in Figure 14, but with the upper stationary valve plate in place with respect thereto.

The lower part of the body includes an integrally formed frame cross 37, which merges into a centrally disposed part 38, which rises vertically to afford a flat rest or base 39, as shown in Figures 1 and 18. The part 38 is vertically hollowed out, as at 40, to form a taper socket to fit over a taper plug on a cover of a milk receiver pail. A pin (not shown) serves in the usual way to make a quickly detachable lock, whereby the pulsator socket 40 may be secured to or quickly removed from the pail cover. This pin is part of a conventional bayonet slot arrangement and need not further be described. The part 38 includes two chambers 42, and two diametrically aligned bars of the cross 37 are drilled and tapped to receive threaded nipples 43, one each of which communicates with a chamber 42, while a third bar of the cross is drilled and tapped with a relatively large bore to receive a relatively larger nipple 44, that communicates not with the chambers 42, but with the interior of the taper socket 40, as described in my prior patent.

Vacuum is applied to the milk pail, not shown, through the larger nipple 44 in the pulsator, said nipple in a complete system being connected to a pipe line stall cock by a stanchion hose in a manner well understood in this art. The nipples 43 are air nipples connected by suitable hoses to the claws of the teat cup clusters. When the outfit is for milking only one cow, only one such cluster is necessary, and, accordingly, it is to be understood that one of the nipples 43 will be unscrewed and a screw plug will be substituted therefor in a manner to stop up one of the air bores in the cross 37. The fourth bar of the cross not yet mentioned is left solid and serves merely as a frame piece. The valve structure, which makes and regulates the pulsations acting in the teat cups to produce the milking action, will now be described.

Figure 20:
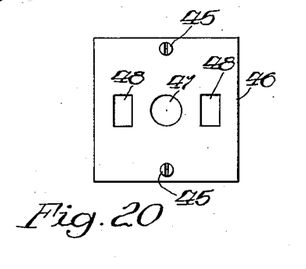
Figure 20 is a top plan view of the lower, stationary plate.

The base 39 in effect forms a square horizontal table carrying screws 45 for securing to the base 39, a square shaped, lower, stationary valve plate 46, shown in detail in Figure 20. This plate 46 is preferably made of hardened stainless steel, having surfaces ground and polished to mirror-like finish. This stationary plate 46 has a central hole 47 connecting with the vacuum supply through the taper socket 40, while side slots 48 in the plate communicate with the air chambers 42 and air nipples 43. (See also Figure 1).

Figure 17:
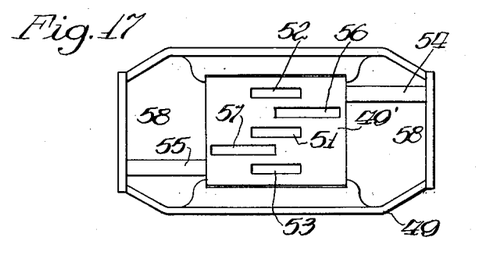
Figure 17 is a plan view of the milker slide.

Next in the assembly is the lower or milker slide 49, shown in detail in Figures 17 and 18, inclusive, which valve is disposed horizontally on the lower stationary valve plate 46 and cut out at its side edge, so as not to interfere with the screws 45, said slide 49 being disposed to reciprocate, as shown in the drawings, only in an east (E) and west (W) direction. This lower or milker slide has a square cut-out mid-portion to receive a separate conforming valve plate or piece 49', preferably made of brass or other relatively soft material, so that the friction between the top surface of the plate 46 and the bottom surface of the slide valve plate 49' is reduced to a minimum, and, as a result, these cooperating surfaces may be run dry and no oil is required. The E end of the slide 49 is secured by means of a screw and washer 50 to the E diaphragm 34, while the W end of said valve is similarly secured by the same kind of means 50 to the W diaphragm 34, as best appears from Figure 1. The slide valve plate 49' is rectangular in shape (Figure 17) and at the intersection of its center lines is provided with a short, lengthwise slot 51, and in cross alignment therewith the valve plate's upper surface is formed with two grooves 52, 53 in communication, respectively, with flexible hose members 54, 55 extending from the said valve plate 49' along its ends in opposite directions and terminating in communication, respectively, with the E and W diaphragm chambers 36. A groove 56 is formed in the slide valve plate 49' to one side of the valve's longitudinal center line and extends a substantial distance to the E, while an oppositely disposed, similar groove 57 extends toward the W, the inner ends of each of these grooves being cut square, as shown (see Figure 17). At its ends, the slide 49 is formed with relatively large openings 58.

Figure 4:
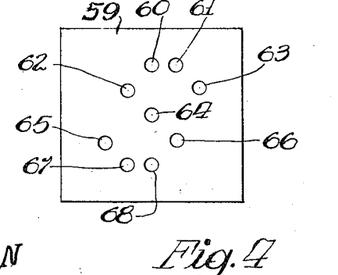
Figure 4 is a top plan view of the upper stationary valve plate.
Figure 11:
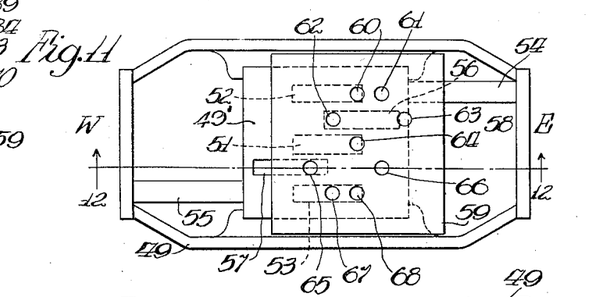
Figure 11 is a plan view of the milker slide assembly with its grooved center piece and the upper stationary valve plate appearing on top.
Figure 12:
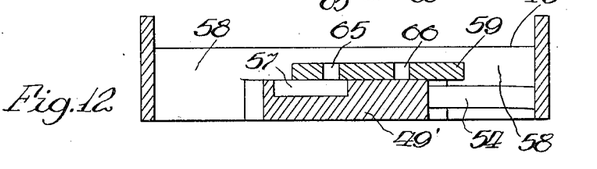
Figure 12 is a cross-sectional view through the assembly of Figure 11, as seen along the line 12—12 shown in that figure.

In Figure 4 is shown the upper, stationary valve plate 59, which comes next in the assembly, said plate being like the lower plate 46 in that it is hard, and polished. The plate 59 is held against lateral movement by its being fitted between the side walls of the milker slide 49, as shown in Figures 11 and 12, but said plate may float, if necessary. Placed therein in the desired manner, this upper, stationary valve plate is provided with nine holes 60, 61, 62, 63, 64, 65, 66, 67, and 68.

Figure 13:
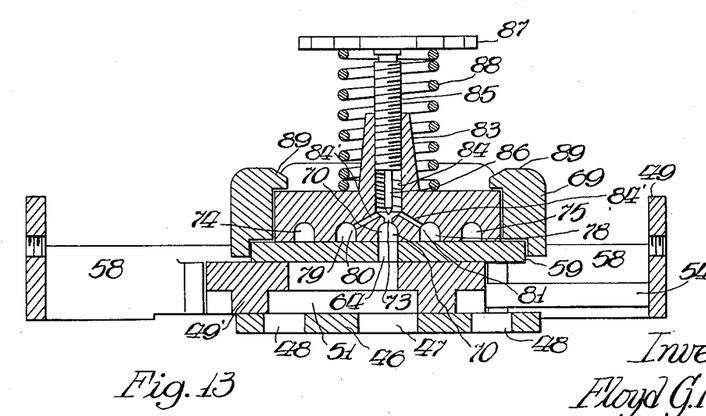
Figure 13 is a detail, vertical, cross-sectional view through the assembly of slides and valve plates per se on an enlarged scale, as shown in Figure 1.
Figure 14:
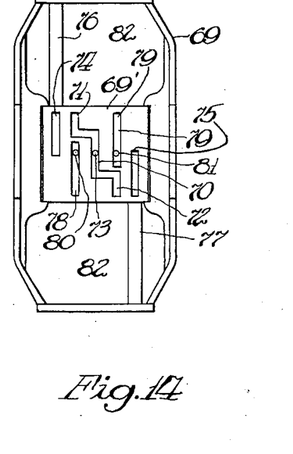
Figure 14 is a bottom plan view of the control slide shown in Figure 9.
Figure 15:
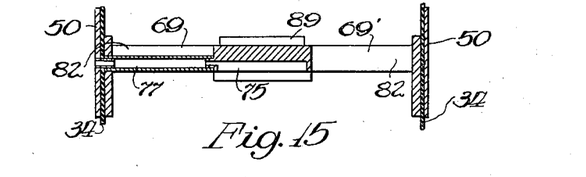
Figure 15 is a cross-sectional view through the control slide assembly, as seen along the line 15—15 of Figure 9, looking in the direction of the arrows.
Figure 16:
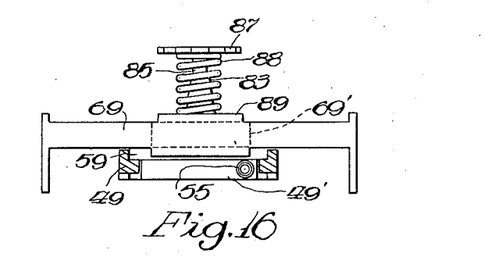
Figure 16 is a side view of the control slide assembly showing the milker slide associated therewith in cross section.

The control slide is shown generally at 69 in Figures 9, 10, 14, 15, 16, and 19, said slide being rectangular and lying on the upper valve plate 59 for reciprocation, as illustrated in the drawings, in a north (N) and south (S) direction. This control slide 69 is also hollowed out square in its mid-portion loosely to receive the control valve plate 69', which valve plate is also made of brass or the like, so it will have little or no friction when sliding over the top surface of the plate 59, and consequently no oil is required. The under surface of the control slide plate 69', as appears best in Figure 14, is formed with a short, centrally disposed, lengthwise groove 70, the ends of which are continued in opposite directions to form connecting, offset grooves 71, 72. A pin hole 73 is located centrally through the groove 70 and valve plate 69'. This valve plate 69' on its bottom has also two diametrically opposed side grooves 74, 75 which, respectively, communicate with flexible hoses 76, 77, respectively, communicating with the N and S diaphragm chambers 36 as best shown in Figure 2, the control slide 69 in the same manner as the milker slide 49 having its respective ends connected to the N and S diaphragms 34. Still further, this plate 69' on its bottom is formed with two intermediate, diametrically opposed, lengthwise grooves 78 and 79, each of which at its outer extremity communicates with through-holes 80 and 81, respectively. At its ends the slide 69 is formed with large openings 82. The top surface of this control slide valve plate 69' is formed with an upstanding boss 83 having a threaded bore 84, which is in communication with the slots 78 and 79 heretofore mentioned through holes 80 and 81, as appears in Figure 13.

A screw 85 fits the bore 84 and carries a needle valve 86 at its lower end, to regulate the size of opening 73, said screw being manipulated by a thumb-screw head 87 and held against accidental turning by a coil spring 88 seated between the valve 69' and the thumb-screw head.

The side edges of the control slide 69 are formed with inwardly extending shoulders 89 to guide the valve plate 69', and the overhang of said shoulders serves to limit upward floating movement of the plate 69', said shoulders being spaced normally a slight distance above the plate 69' to allow such movement as appears in Figure 13. This concludes the description of the structural parts of the pulsator. The specification will now be continued by setting forth the mode of operation.

A taper plug (not shown) provided on the milk receiver pail cover receives the socket 40 of the pulsator in a conventional manner. Vacuum is applied to the pail through the large nipple 44 in the pulsator, which is connected to a pipe line stall cock by a stanchion hose.

The adjustable needle valve 86 on the upper slide valve plate 49', operated by the control slide 69', serves as a speed regulator by controlling the admission of air, and yet, no matter how slow the slide and valve plate move, a rapid movement of the lower or milker slide 49 and valve plate 49', will nevertheless take place, the slide 49 remaining at the end of its stroke until the control slide slowly approaches the other end of its stroke. Such a snappy, strong pulsation is the most agreeable to the cow and so milks the cow rapidly and leaves but little for hand stripping.

The four diaphragms 34 are mounted one on each end of the two slides 49 and 69. Each diaphragm is so clamped under a cover 35 as to allow the slides which are fastened to the center of the diaphragms to move freely from $\frac{5}{16}$ inch to $\frac{3}{8}$ inch in a horizontal direction. As vacuum is applied by a passage-way and flexible hose leading to the face of each slide, which connects through a hole to the chamber in back of each diaphragm, movement is provided in the direction to which the vacuum is applied. At the same time, the diaphragm chamber space at the opposite end of the slide must be opened to the atmosphere to relieve the vacuum that had previously been supplied to it.

As shown in Figures 1 and 2, for example, the milker slide 49 and valve plate 49' have moved to the west position, so that vacuum has been applied to the left hand nipple 43 which connects through a rubber hose to the milker claw, not shown. The lower part of this claw, in the usual way, collects the milk from the four teat cups connected to the claw and leads it through a milk hose to the milk receiver pail, said pail and milk line being under continuous vacuum. Around the upper part of these claws in the usual way are four additional nipples which lead to the space between the teat cup rubber liner and metal teat cup shell. A rubber air hose makes the connection between this claw and the pulsator, the said hose being connected to the pulsator air nipples 43. Thus, with the milker slide 49 and its valve plate 49' in the west position, vacuum is applied to this liner space, which holds it in a normal position, because there is, at this time, a vacuum on both sides of the rubber liner. Milk now flows from the cow's teat until this milker pulsator slide and valve move to the east position. Then the east port is uncovered and air rushes in to destroy the vacuum, and so allows the rubber liner to collapse strongly upon the cow's teat, shutting off the milk and massaging the teat in a manner to keep up blood circulation. At the next movement of the milker slide and valve plate, the vacuum is applied again to the liner, which once more returns to normal to cause milk to flow, and so the action alternately continues at from 40 to 50 pulsations per minute.

Generally, grooves or slots, on the upper side of the milker slide valve plate 49' and on the lower side of the control valve plate 69', move across the holes in the upper stationary valve plate 59 and so govern the relative movement of the slides 49, 69 in the particular manner now to be set forth.

On the upper side of the control slide valve plate 69' is mounted the regulating needle valve screw 84. The center hole 64 in the upper stationary valve plate 59, which lies loosely on top of the milker slide valve plate 49', is always connected with the center port 51 in the milker slide plate 49', which port 51 is a slot that is open clear through, so that it is in continuous connection with the vacuum supply independently of the relative positions assumed in the operation of the pulsator by either slide. On the under side of the control slide valve plate 69' is a port 70, which is also at all times in connection with the hole 64 which covers port 51 in the milker slide valve plate 49'. Thus, it can be seen that port 70, with its offset ends 71 and 72, is constantly connected to the vacuum line. By turning to the sectional view of Figure 1, it will be seen that the needle valve 86 is operable in this same port 70. Ports 79 and 78 have holes 81 and 80 in one end drilled in the control slide valve plate 69', to connect it with the passages 84', which passages 84' serve to distribute the flow of air by the needle valve 86 to the port 70.

Figure 3:
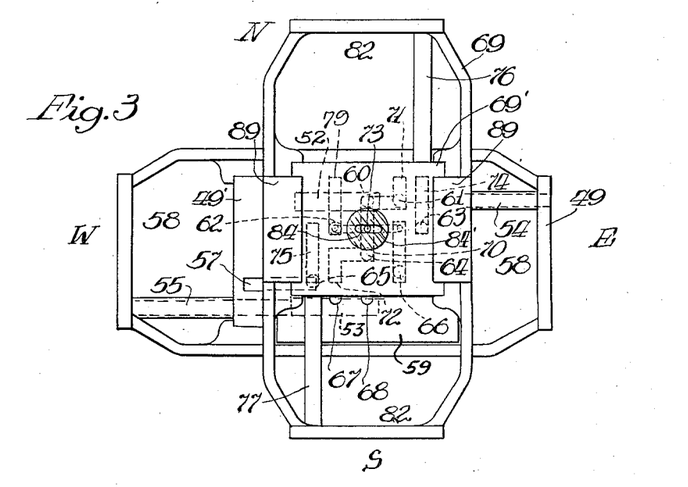
Figure 3 is a top plan view, showing the upper or control slide, the lower or milker slide with the cooperative ported and grooved center pieces, and the upper stationary valve plate therebetween.
Figure 5:
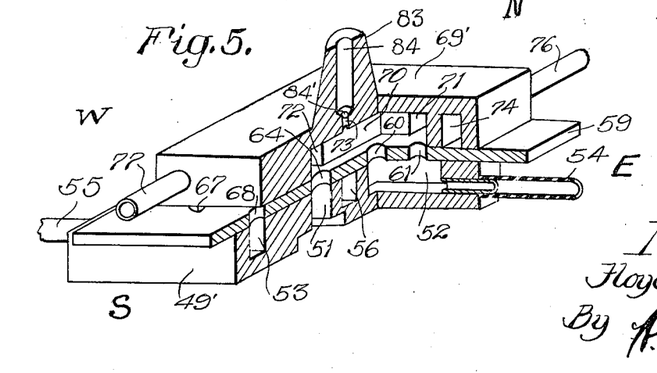
Figure 5 is a perspective view, partly sectioned and broken away, to illustrate the slide and valve assembly when the control slide is in the north position and the milker slide is in the west position ready to move east, the view being taken along the section line 5—5 of Figure 3 looking in the direction of the arrows.

In describing the operation, it will be assumed that the starting position of the parts is shown in Figure 3, where the control valve 69 with its plate 69' is in the north position and the slide valve 49 with its plate 49' is in the west position preparatory to a movement east. It will be seen from the drawings that the two holes 67, 68, in the upper stationary valve plate 59, are uncovered by the location of the control valve plate 69' in the north position. The holes 67, 68 being thus uncovered, air is allowed to pass through them to the slot 53 (Figure 11) in the slide valve plate 49', which slot is in constant communication with the hose member 55 and the holes 67, 68, thus supplying air to the west diaphragm chamber 36. At the same time, vacuum is applied through the nipple 44 (Figure 1) to the chamber 40 through the opening 47 in the lower stationary valve plate 46 (Figure 20). As shown in Figures 3 and 5, the port 70 in the control valve plate 69', being in the north position, connects the holes 60, 64, said hole 64 being in direct communication with the vacuum supply through the opening 47 in the lower valve plate 46, and the open slot 51 in the slide valve plate 49' (Figure 5). Thus, it will be apparent that vacuum from the nipple 44 is applied through the openings 47, 51, 64 across port 70 to the hole 60. It will be further noted that the hole 60 is in constant communication with the slot 52 (Figure 11) and, through the hose 54, with the east diaphragm chamber 36. With the above positioning of the valve plates 49' and 69' it will be seen that air is supplied to the west diaphragm chamber and vacuum to the east chamber, with the result that the air pressure on the collapsed diaphragm in the west chamber forces slide valve plate 49' east simultaneously with the suction of the vacuum in the east diaphragm chamber, the valves now assuming the positions shown in Figure 6, preparatory to a movement south by the control valve 69.

Figure 6:
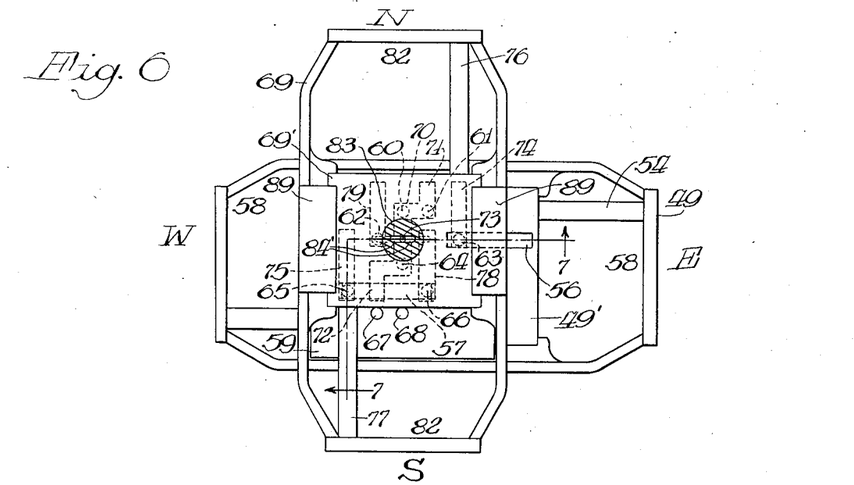
Figure 6 is a plan view similar to Figure 3, but showing the slides in a different relative position.
Figure 7:
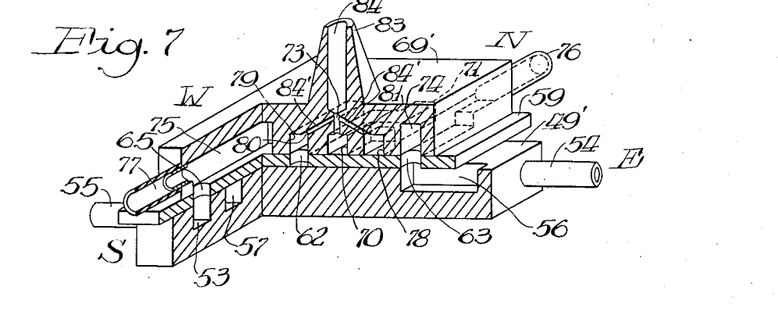
Figure 7 is an oblique perspective view taken along the line 7—7 of Figure 6 and showing the control slide in its north position about to move south, and the lower or milker slide in the east position.
Figure 8:
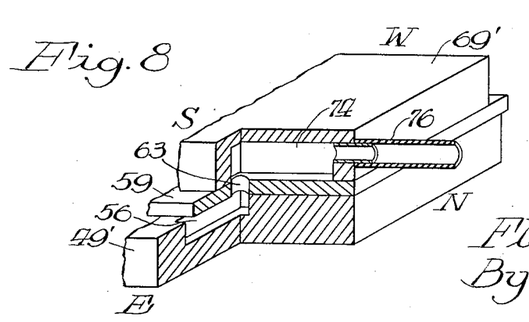
Figure 8 is a view showing the same relative position of the slides appearing in Figure 7, but looking from a different side to show the north extending passage in the upper or control slide in full lines, said passage appearing in dotted lines in Figure 7.
Figure 9:
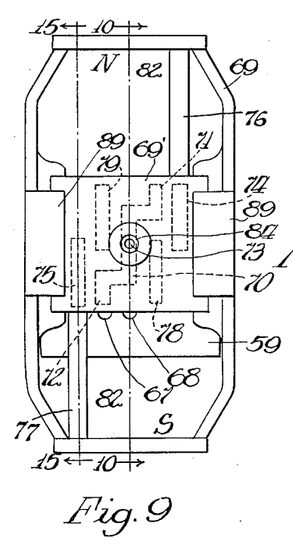
Figure 9 is a plan view of the control slide in relation to the inserted separate piece formed with grooves and ports, and the upper stationary valve plate.
Figure 10:
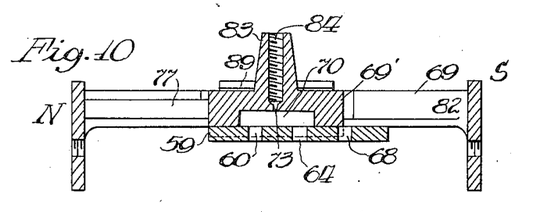
Figure 10 is a cross-sectional view through the assembly of Figure 9, as seen along the line 10—10 shown in that figure.

It will be noted in Figure 6 that the slide valve plate 49', having moved east, leaves the end of the slot 56 in said slide valve plate uncovered to the air, as is also shown in Figures 7 and 8. In the east position the slot 56 is in direct communication with the hole 63 in the upper stationary valve plate 59, which hole 63 in turn communicates with the slot 74 in the control valve plate 69'. As shown in Figures 6, 7, 8, and 9, the slot 74 communicates with the hose 76. By this means of aligning slot 56, hole 64 and slot 74, air is applied to the collapsed diaphragm 34 in the north diaphragm chamber 36. Vacuum, continually applied through the nipple 44, opening 47 in lower stationary plate 46, and opening 51 in lower slide valve plate 49', draws downwardly through port 70 in the control valve plate 69', which port 70 is in constant communication with the hole 64 in the upper stationary plate 59, as is port 51 in the slide valve (see Figures 6 and 23). Through the small ports 84', the vacuum is communicated to slots 78 and 79 in the control valve plate 69' (Figures 7 and 13). While the control valve 69 is in the north position and slide valve 49' east, the slot 78 is connected through hole 66 in the upper stationary plate 59 with the slot 57 in the slide valve plate 49', which slot 57 communicates with the hole 65 in the upper stationary plate 59 (Figure 6). Further, the hole 65 is in constant communication with the slot 75 in the control valve plate 69', and, therefore, in communication through the hose 77 with the south diaphragm chamber 36 (Figure 6).

It will be apparent from the above locations of ports that air is supplied to the north diaphragm chamber 36, through slot 56, hole 63, slot 74 and hose 76. At the same time vacuum is applied to the south chamber from the nipple 44 through the openings 47 and 51, hole 64, port 70, passage 84', slot 78, hole 66, slot 57, hole 65, slot 75 and hose 77. It will be understood that by the same procedure followed in moving slide valve plate 49' east the control valve plate 69' is moved south; that is, air pressure in the north diaphragm chamber forces control valve 69 south simultaneously with the suction of vacuum in the south diaphragm chamber.

Figures 21, 22, 23:
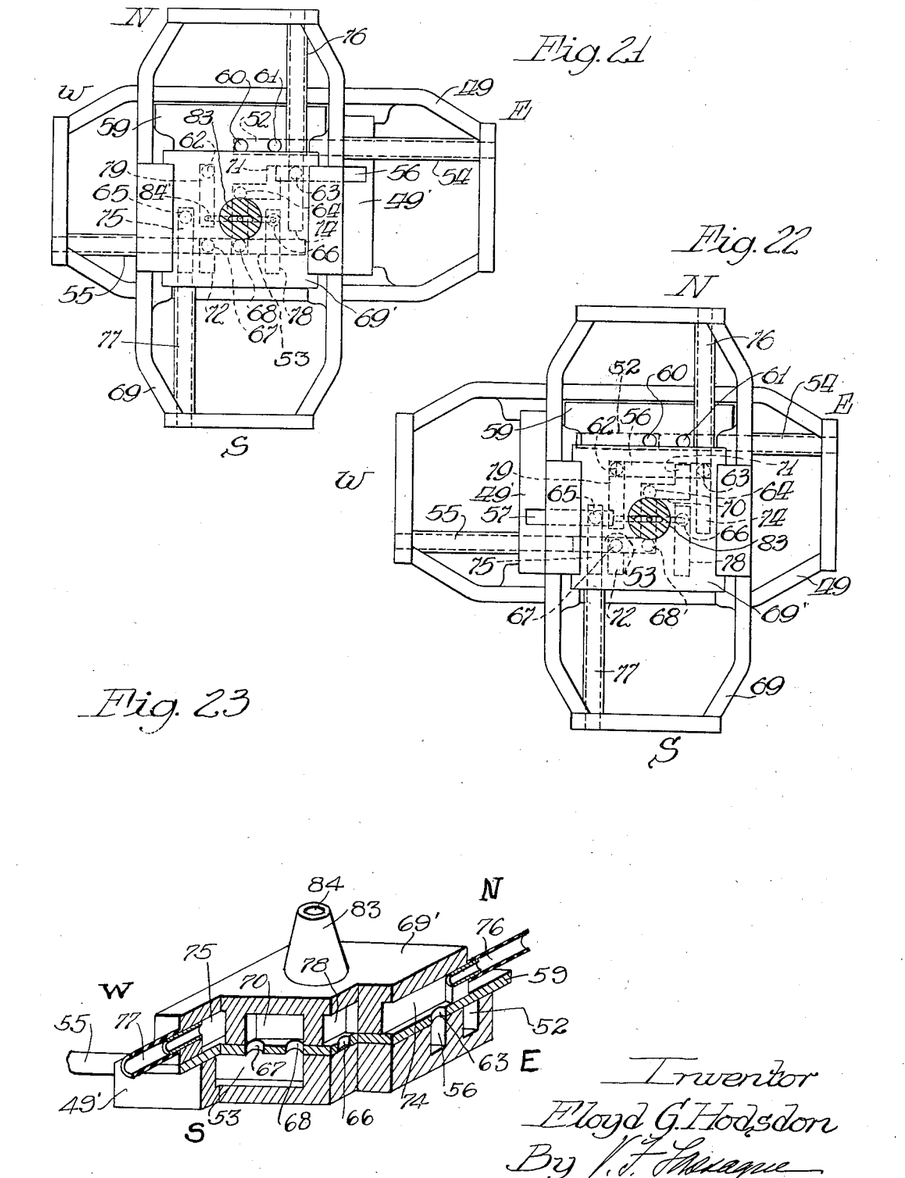
Figures 21 and 22 are detail views to show relative positioning of the control and slide valves during operation.
Figure 23 is a view in sectional perspective as viewed along the section line 23—23 of Figure 22 looking in the direction of the arrows.

As shown in Figure 21, the control valve plate 69' has moved south; the slide valve plate 49' is in the east position preparatory to a movement west. When the control valve has assumed its position at south, the holes 60, 61 are uncovered to air which passes through the slot 52 and hose 54 to the east diaphragm chamber. At the same time, vacuum is applied as before through the nipple 44, chamber 40, openings 47, 51 and 64, across port 70 to the hole 68, and to the west diaphragm chamber through slot 53 and hose 55. The vacuum is at west and air pressure at east; therefore, the slide valve plate 49' is moved west while the control valve plate 69' is still in the south position, as shown in Figure 22, where it awaits a movement to the north position (Figure 3).

As shown in Figure 22, the control valve plate 69' is still in the south position and the slide valve plate 49' has moved west. With the slide valve plate 49' in the west position, the slot 57 is uncovered to air, which passes through 57 and up through the hole 65, which is in constant communication therewith. The hole 65 in turn communicates with the slot 75 and hose 77 and thence to the south diaphragm chamber. Thus is the air supplied to the collapsed diaphragm 34 in the south chamber 36. As is evident from the disclosures of the other movements, vacuum is applied through the nipple 44, through the chamber 40, through openings 47, 51, and through the hole 64 in the upper stationary valve plate 59. From the hole 64 the vacuum draws downwardly through the port 70 and across the passageway 84' to the slot 79, from whence it draws upwardly through the hole 62 in the upper stationary plate 59. The slot 56 in the slide valve plate 49' connects the hole 62 with the hole 63, also in the upper stationary plate 59. The hole 63 is in constant communication with the slot 74 in the control valve plate 69' and with the hose 76. Thus, it will be apparent that vacuum is applied to the north diaphragm chamber through nipple 44, chamber 40, openings 47 and 51, hole 64, across port 70, through passageway 84', through slot 79, hole 62, slot 56, hole 63, slot 74, and hose 76. By the application of vacuum to the north diaphragm chamber, simultaneously with the application of air to the south diaphragm chamber, the control valve plate 69' is moved to the north position while the slide valve plate 49' remains in the west position, which is shown in Figure 3.

It will be readily seen that starting with the control valve north and slide valve west (Figure 3), the movements follow. In Figure 6, the slide valve plate 49' has moved east; in Figure 21, the control valve plate 69' has moved south; in Figure 22, the slide valve plate 49 has moved west; and back to Figure 3 where the control valve plate 69' has moved north to finish the four direction cycle.

It will be noticed that both ends of the groove 70 and one inner end of each of the grooves 56 and 57 are finished square. As the square ends of these grooves approach and move across their corresponding holes in the stationary upper valve plate 59, they present the largest possible opening with the least movement and are important in that they make the beginning of each of the four strokes. The length and position of these grooves are so arranged that air is allowed to enter and release one diaphragm slightly in advance of opening to vacuum the diaphagm on the opposite end of each slide valve.

In operation, the upper or control slide 69 and 75 valve plate 69' move slowly together, as a unit, back and forth, and, at each end of their stroke, the lower or pulsator milker slide 49 and valve plate 49' reverse their position quickly, so that the pulsations made by the ports on the under side of the lower slide valve plate are positive from vacuum to release, with no dragging action between pulsations. As herein shown, the control and milker slides move along intersecting axes.

The upper and lower stationary valve plates 59, 46, are made of very hard material and are polished smooth, so that there is no leakage from one port to another. The slide valve plates 49', 69' slide across the stationary plates, when dry, with but little friction. Vacuum tends to pull these valves together and, the longer these faces slide on each other, the closer they will fit together. No oil whatever is required on this pulsator, so there is nothing to collect dust out of the atmosphere.

Thus, the pulsator, having such large diaphragms, is very powerful and will pulsate on a minimum of only two inches of vacuum; or on a fifteen inch vacuum, there is available a force of twenty pounds to move the slides and their valves. Such a large force is not at all necessary, except that, the greater the energy supplied to the energy required, the more accurate will the pulsator speed be maintained. From a manufacturing standpoint, this pulsator should be cheap to build. There are no trigger springs or small bearings. No small drilled holes are required in the large main body casting. All ports are put in the slidable valve plates where they are easily accessible. Only two main moving parts are involved and, as they are inside the body, they are thoroughly protected. A screw driver is all that is needed to take the pulsator completely apart and to put it together again.

The flexible connection of the sliding valve plates 49', 69' to their respective diaphragm chambers 36 through the flexible hoses described is important from the standpoint of manufacture and improved operation, as extreme precision is not necessary and the two plates 49', 69' can float relative to their slides 49, 69 without interfering with the communication which the plates 49', 69' must maintain with the diaphragm chambers. Such floating of the plates 49', 69' is desirable because the slides 49, 69 cannot float vertically, as their ends are securely fastened to the diaphragms, which do not give sufficiently in vertical or up and down directions. Therefore, precise centering of the connection of the ends of the slides 49, 69 to the diaphragms is not required.

The example herein disclosed obviously represents only one practicable form which the invention may assume. Therefore, it is the intention herein to cover all such variations and modifications thereof which do not materially depart from the spirit and scope of the invention as is indicated by the definitions thereof comprising the appended claims.

What is claimed is:

1. In a milking machine pulsator, a body including a connection to a source of vacuum and a connection to air, a milker slide, a control slide, said slides being relatively reciprocable in the body and formed with pockets, said pockets being formed to receive loosely and floatingly separate valve plates movable with their respective slides, a ported plate between the two valve plates, said two valve plates formed with grooves and passages to regulate porting to vacuum and air to move the slides.

2. A pulsator for milking machines comprising a body including a base open to air and a source of vacuum, a control slide and milker slide supported for relative sliding movement inside the body above the base, each of said slides having a pocket, a separate control valve plate carried in the control slide pocket and movable with the slide, a separate milker valve plate carried in the milker slide pocket and movable with said slide, said plates being formed with cooperating ports and grooves, and a non-slidable valve plate located between said control and milker plates.

3. A pulsator for milking machines comprising a body including a base open to air and a source of vacuum, a control slide and milker slide supported for relative sliding movement inside the body above the base, each of said slides having a pocket, a separate control valve plate carried in the control slide pocket and movable with the slide, a separate milker valve plate carried in the milker slide pocket and movable with said slide, said plates being formed with cooperating ports and grooves, and a non-slidable valve plate located between said control and milker plates, said separate and the non-slidable plates having vertical bodily floating movement independently of the slides.

4. In a milking machine pulsator, a body including a connection to a source of vacuum and a connection to air, a milker slide, a control slide, said slides being elongated and relatively reciprocable in the body on horizontal planes and along intersecting axes, said slides being formed with an opening intermediate their ends, said openings each receiving a separate and floatable valve plate slidable with its respective slide, and a non-slidable valve plate located between the two aforementioned plates.

5. In a milking machine pulsator, a body including a connection to a source of vacuum and a connection to air, a milker slide, a control slide thereabove, said slides being relatively reciprocable in the body and formed with pockets, a milker valve plate loosely seated in the milker slide pocket and slidable with the milker slide, a control valve plate loosely seated in the control slide pocket and slidable with the control slide, a non-slidable valve plate between the two aforementioned plates, said two slidable plates being formed with grooves and passages to regulate porting to vacuum and air to move the slides and a speed regulator throttle means carried by the control valve plate.

6. In a milking machine pulsator, a body including a continuous connection to a source of vacuum and a connection to air, a milker slide having a pocket, a separate milker valve plate in said pocket, a control slide having a pocket with a separate control valve plate in its pocket, said valve plates having cooperating ports and with the slides being slidable crosswise of each other, and means controlling porting to vacuum and air whereby the control slide moves a full stroke while the milker slide is idle and then causes the milker slide to make a quick stroke to transmit pulsations to the teat cups of a milking machine.

7. In a milking machine pulsator, a body having four open sides, means connecting the body to vacuum and air, a cap closing each side and enclosing a diaphragm to provide four diaphragm chambers, a pair of relatively movable elongated slides, each connected to and between a pair of the diaphragms, said slides each formed to receive a separate valve plate slidable with its slide, said valve plates provided with means to distribute air and vacuum, flexible conduits connected between the ends of said valve plates and the adjacent diaphragm chambers, and a non-slidable valve plate between the two aforementioned valve plates to cause movement of the slides and their valve plates whereby pulsations are transmitted to teat cups of a milking machine.

8. In a milking machine pulsator, a body having four open sides, means connecting the body to vacuum and air, a cap closing each side and enclosing a diaphragm to provide four diaphragm chambers, a control slide and a milker slide supported in the body and connected to said diaphragm, each slide provided with a pocket to receive a separate valve plate slidable with its slide, said plates being formed with means to communicate with the air and vacuum, flexible connections between the plates and diaphragm chambers to lead air and vacuum to the latter, and other valve means associated with the aforementioned plates whereby pulsations are transmitted to teat cups of a milking machine.

9. In a milking machine pulsator, a body having four open sides, means connecting the body to vacuum and air, a cap closing each side and enclosing a diaphragm to provide four diaphragm chambers arranged in opposed pairs, a pair of relatively movable reciprocatory elongated slides supported in the body and connected at their ends to the diaphragms, said slides being formed intermediate their ends with an opening, a separate valve plate in the opening of each slide and reciprocable therewith, said slides with their valve plates being reciprocable along intersecting axes and the plates being provided with cooperating ports certain of which communicate with air and vacuum, flexible conduits to lead air or vacuum from the plates to the diaphragm chambers, and a non-reciprocable valve plate located between the two aforementioned valve plates.

10. In a milking machine pulsator, a body having four open sides, means connecting the body to vacuum and air, a cap closing each side and enclosing a diaphragm to provide four diaphragm chambers arranged in opposed pairs, a milker slide, a control slide, said slides being relatively reciprocable in the body and connected at their ends to the diaphragms, said slides also being formed with a large opening to receive loosely and floatingly separate valve plates reciprocable with their respective slides, said two plates being formed with grooves and passages and also connected by flexible conduits to the diaphragm chambers, and a ported non-reciprocable plate between the two aforementioned plates to regulate porting to vacuum and air to move the slides.

11. In a milking machine pulsator, a body having four open sides, means connecting the body to vacuum and air, a cap closing each side and enclosing a diaphragm to provide four diaphragm chambers arranged in opposed pairs, a milker slide, a control slide, said slides being relatively reciprocable in the body and connected at their ends to the diaphragms, said slides also being formed with a large opening to receive loosely and floatingly separate valve plates reciprocable with their respective slides, said two plates formed with grooves and passages and also connected by flexible conduits to the diaphragm chambers, a ported non-reciprocable plate between the two aforementioned plates to regulate porting to vacuum and air to move the slides, and a throttle valve operable on the control slide valve plate to regulate the speed of reciprocation of the slides.

FLOYD G. HODSDON.